(12) United States Patent
Burt (10) Patent No.: US 12,434,981 B2
(45) Date of Patent: Oct. 7, 2025

(54) CONTINUED POWER FOR GRINDER PUMPS BASED ON ELEVATED LOAD

(71) Applicant: Innovative Utility Solutions, LLC, Tyler, TX (US)

(72) Inventor: Tracy Burt, Tyler, TX (US)

(73) Assignee: Innovative Utility Solutions, LLC, Tyler, TX (US)

( * ) Notice: Subject to any disclaimer, the term of this patent is extended or adjusted under 35 U.S.C. 154(b) by 497 days.

(21) Appl. No.: 17/821,441

(22) Filed: Aug. 22, 2022

(65) Prior Publication Data

US 2023/0053488 A1 Feb. 23, 2023

Related U.S. Application Data

(60) Provisional application No. 63/236,138, filed on Aug. 23, 2021.

(51) Int. Cl.
| | |
|---|---|
| *C02F 1/00* | (2023.01) |
| *F04B 49/06* | (2006.01) |
| *C02F 103/00* | (2006.01) |
| *F04B 49/025* | (2006.01) |

(52) U.S. Cl.
CPC ............ *C02F 1/008* (2013.01); *F04B 49/065* (2013.01); *C02F 2103/005* (2013.01); *C02F 2209/001* (2013.01); *C02F 2209/006* (2013.01); *C02F 2303/26* (2013.01); *F04B 49/025* (2013.01); *F04B 2207/01* (2013.01)

(58) Field of Classification Search
None
See application file for complete search history.

(56) References Cited

U.S. PATENT DOCUMENTS

| | | | |
|---|---|---|---|
| 2011/0110794 A1* | 5/2011 | Mayleben | F04D 15/0218 417/313 |
| 2013/0056423 A1* | 3/2013 | Linguist | C02F 1/78 210/741 |

OTHER PUBLICATIONS

Innovative Utility Solutions, LLC, "Sewage Pump Grinder Clog Prevention," https://innovativeutility.com/sewage-pump-grinder-clog, Aug. 19, 2021, pp. 1-9.

(Continued)

*Primary Examiner* — Richard C Gurtowski
(74) *Attorney, Agent, or Firm* — Robert C. Kowert; Kowert, Hood, Munyon, Rankin & Goetzel, P.C.

(57) ABSTRACT

A hardware (e.g., a process and/or circuitry) and/or software-based controller for septic system grinder or chopper units monitors load to the unit. As the unit encounters debris, electrical and mechanical load on the unit increases. In some cases, a signal to stop the unit from grinding/chopping (including but not limited to a signal based a waste-water level) is received while the unit is under the increased load. The controller may override the stop signal and continue sending power to the unit to clear the unit from debris causing increased load. The override may cease when it is determined that the debris has been cleared, such as when it is determined that the increased mechanical and/or electrical load on the unit has decreased or returned to a target load, allowing the unit to stop. The unit may include self-configuration functionality, determining thresholds for signaling override, target load, etc.

20 Claims, 8 Drawing Sheets

(56) References Cited

OTHER PUBLICATIONS

Norm Hall, "Sump & Sewage Applications: Choosing 3-Float vs. 4-Float Control," https://innovativeutility.com/float-management-control, May 22, 2020, pp. 1-4.

* cited by examiner

CONTINUED POWER FOR GRINDER PUMPS BASED ON ELEVATED LOAD

This application claims benefit of priority to U.S. Provisional Application Ser. No. 63/236,138, entitled "CONTINUED POWER FOR GRINDER PUMPS BASED ON ELEVATED LOAD," filed Aug. 23, 2021, and which is hereby incorporated herein by reference in its entirety.

BACKGROUND

Wastewater systems use various pumps and grinders to move the wastewater along with various debris in the wastewater. A grinder (sometimes referred to as a "grinder pump" herein) generally grinds debris in fluid (e.g., the water) into smaller pieces that are more easily pumped along with the wastewater. Generally, power to a grinder is controlled based on a level of the wastewater being pumped by the grinder. Power is sent to the grinder when the water level is high to pump the water, and power is shut off to the grinder when the water level is lower to prevent the grinder from running dry. In some instances, debris in wastewater may remain in the mouth of a grinder when the water level drops low enough to shut off the power to the grinder, making restart of the grinder difficult (adding to the wear of the motor driving the grinder), if not impossible without physically pulling and clearing the pump. In some instances, a grinder that was still grinding debris when powered off due to a lowered wastewater level may require removal, cleanout, and reinstallation.

BRIEF DESCRIPTION OF THE DRAWINGS

FIG. 8 is a schematic diagram illustrating circuitry for continued power for two or more grinder pumps While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to a control system for continued power for grinder pumps based on elevated load. Lift Stations in sewage facilities may use a control system (e.g., based on an architecture such as supervisory control and data acquisition (SCADA) or the like) to monitor the activity at each location through the use of a program at a remote location. These programs can perform various functions, such as but not limited to monitoring various physical features of the system (such the depth of wastewater or other fluid in the tank(s)), various features of the sewage pump units (e.g., the amp draw of the motor, when to turn it on and off, a temperature of the motor, etc.) and the like.

Example equipment, such as but not limited to grinder pumps shred and grind up debris such as foreign material that has entered the system. The debris may need to be ground into smaller pieces before going through the pipe and/or tanks because the smaller pieces are more easily pumped. The control system may rely on a signal from water level sensor, such as but not limited to a float or a transducer, to determine when to turn power on and off to the pump based on the fluid level in a tank.

In embodiments, load on the motor may vary. For example, at startup, the pump/grinder motor may pump the wastewater (e.g., sewage or similar) with a constant load (sometimes measured in amps, herein) if the grinder is not grinding debris. As the grinder encounters debris (material large enough or having other characteristics that place a mechanical load on the grinder teeth) the current draw may increase (e.g., depending on how heavy or difficult the material is to grind). Load may vary, increasing and/or decreasing over time as the grinder encounters debris, grinds the debris and pumps the debris out, allowing the teeth of the grinder to move freely without encountering debris.

Grinder, as used herein, may include choppers. Generally, a chopper is a type of grinder that has longer teeth, and may have multiple pumps per hole. The multiple pumps of a grinder may be alternately started/stopped, on an individual basis, in accordance with the use of respective Load-Sensing Power Switches, described herein, in embodiments (e.g., in accordance with FIGS. 1-8).

In embodiments, as the grinder runs the water level drops and when low enough the control system receives a low water signal and instructs power to the pump/grinder to be discontinued. This could be in the middle of a grind which can leave the pump locked up with materials stuck in between the grinder blades for the next start up. In some such cases, the motor will not have enough torque to start up and the pump will have to be extracted from the tank and separated to remove the debris and then check to see if it hasn't damaged the pump. It is hard on the motor to try to start when the grinder teeth are locked and may cause a great increase in amps before tripping an overload circuit, potentially damaging the windings of the grinder/pump motor.

In embodiments, it may be best to set the water level sensor to send a signal to discontinue pumping such that the inlet for the pump and/or the motor for the pump, remains in the water, providing cooling for the motor, for example.

In embodiments, the controller is some combination of hardware and/or software that monitors the load (e.g., via some measure of current draw) of the grinders and keeps the grinder pump running as long as there is load greater than the normal load. In embodiments, configuration parameters for the program are adjustable (e.g., self-adjusting, in some embodiments, see FIG. 3, described below). The parameters may be separately configurable for individual units (e.g., individual pumps, grinders, choppers, etc.) and/or separately configurable for equipment at a particular site/location (e.g., a particular site may use a common set of equipment and the parameters may be the same across the similar equipment).

In embodiments, a configuration module of the controller may determine configuration values such as a normal current draw range for a particular unit and set a perimeter of "X" as the normal load (e.g., as a normal load value or a normal operating range of values, or a percentage of a max load value, etc.).

In some embodiments, the configuration module may determine another parameter "Y" (somewhere above the X parameter). The Y parameter may be used as an override load threshold at or above which the controller will continue sending power to the pump even though a low water shutoff signal has been received. Said otherwise, as the grinder encounters debris and load increases, the controller may continue sending power to the unit even though the water is low enough to stop pumping/grinding. Such a control strategy has the benefit of clearing the grinder of debris so the next grinder startup is easier or even made possible, in embodiments.

In some embodiments, a parameter "Z" may be set to stop the motor when a full load is reached (e.g., to keep the motor from being damaged from overload, a value sometimes provided by the unit manufacturer, or otherwise).

When the load on the unit is relieved (e.g., when the measurement of load goes back to "X" or somewhere between Y and X, to a parameter W, in embodiments) then the controller may exit the override and shut off power to the unit based on the low water level signal.

In one non-limiting example, an installer may set, or an administrator at a control center may set, or a configuration program may calculate, a normal X value as something around 14.3 amps. An installer may set, or an administrator at a control center may set, or a configuration program may calculate, Y at something around 14.8 amps. The controller may use Y as an override threshold to keep the grinder pump running until the load is reduced (e.g., until a load, possibly measured in amps, goes back to normal at (X) 14.3 amps, or somewhere between X and Y, etc.). In some embodiments, the system may determine and store another parameter, a decreased load parameter W (e.g., a parameter set somewhere between a normal range X and the override trigger parameter Y) that is used by the system to determine when to discontinue the override.

Figure 1:
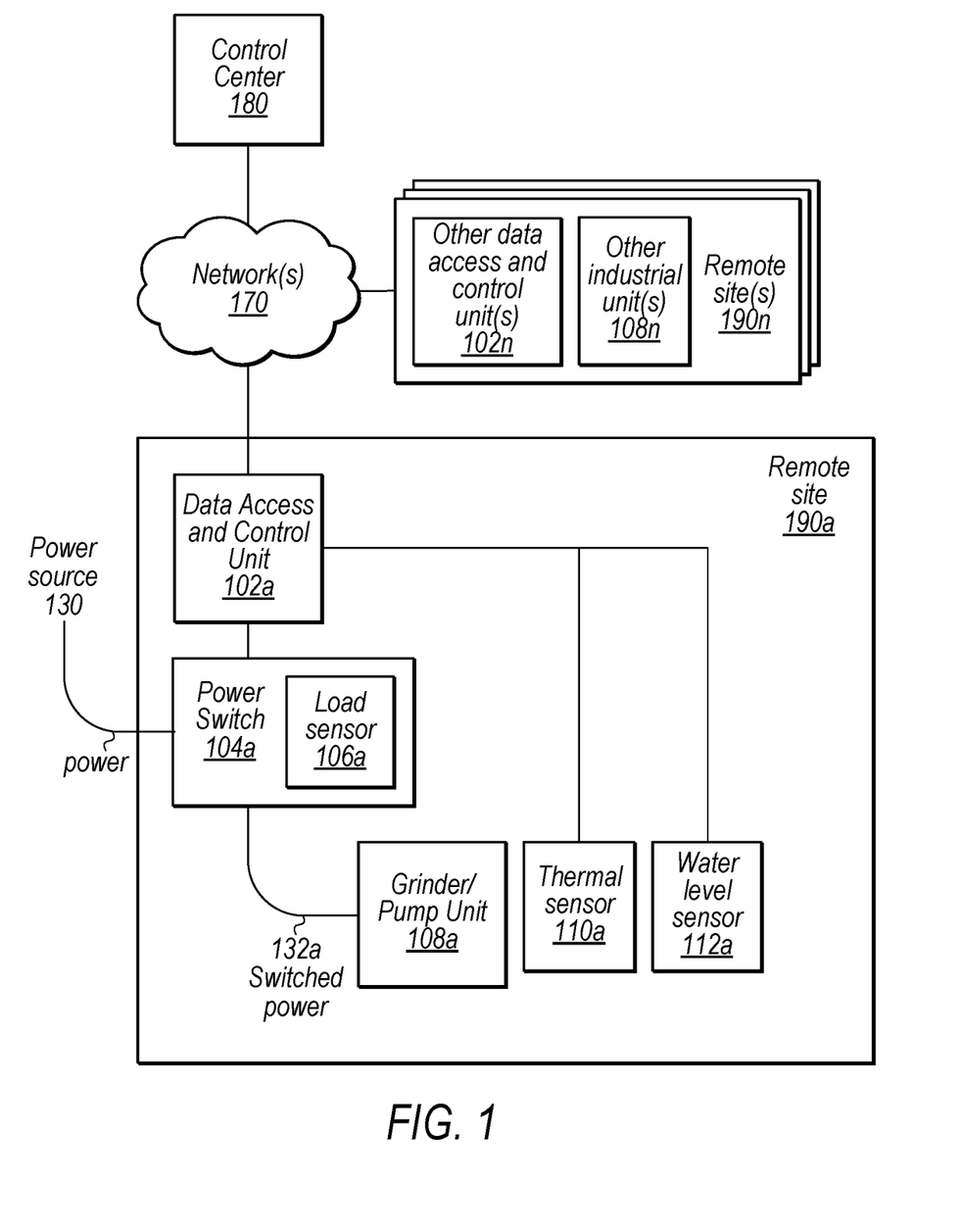
FIG. 1 is a block diagram illustrating a control system architecture for continued power for grinder pumps based on elevated load, according to some embodiments.
Figure 2:
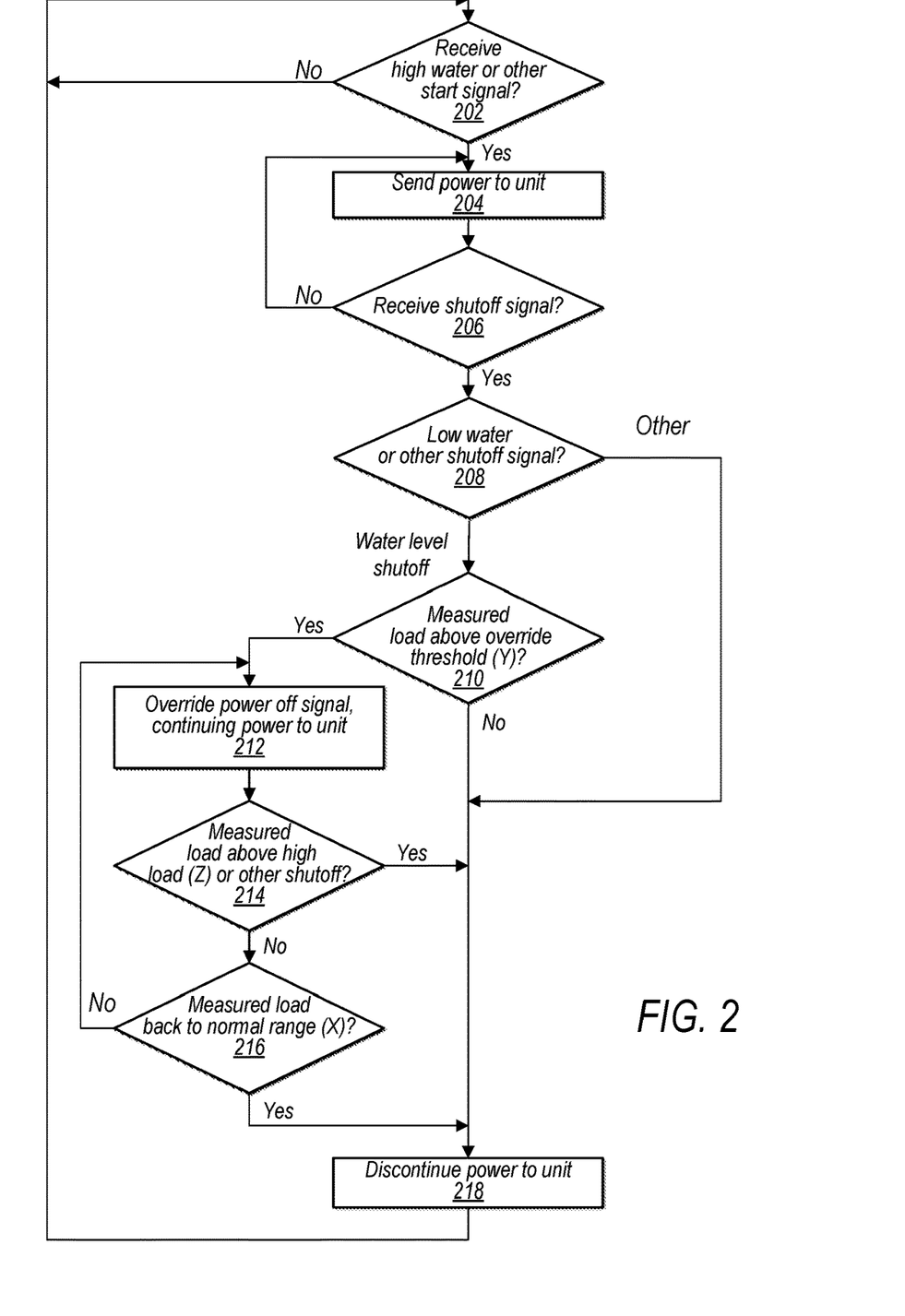
FIG. 2 is a process diagram illustrating workflows for a control system architecture for continued power for grinder pumps based on elevated load, according to some embodiments.
Figure 3:
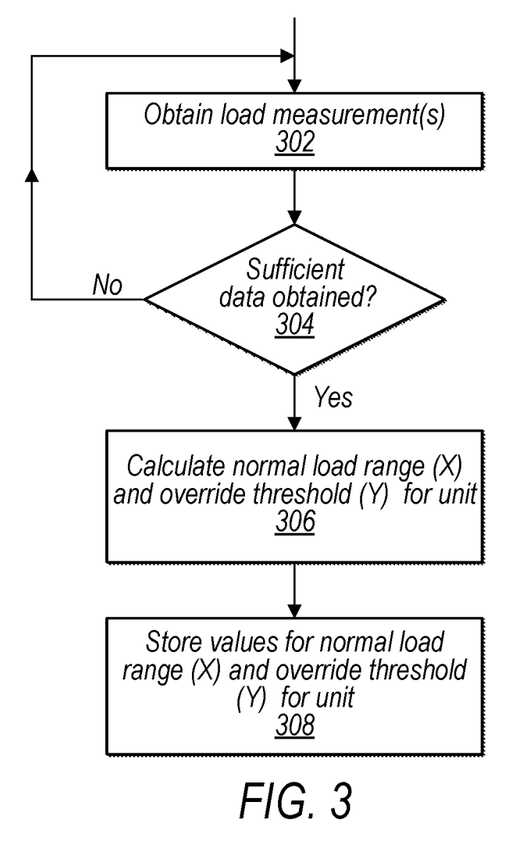
FIG. 3 is a process diagram illustrating a configuration process for a controller that continues power for grinder pumps based on elevated load, according to some embodiments.
Figure 4:
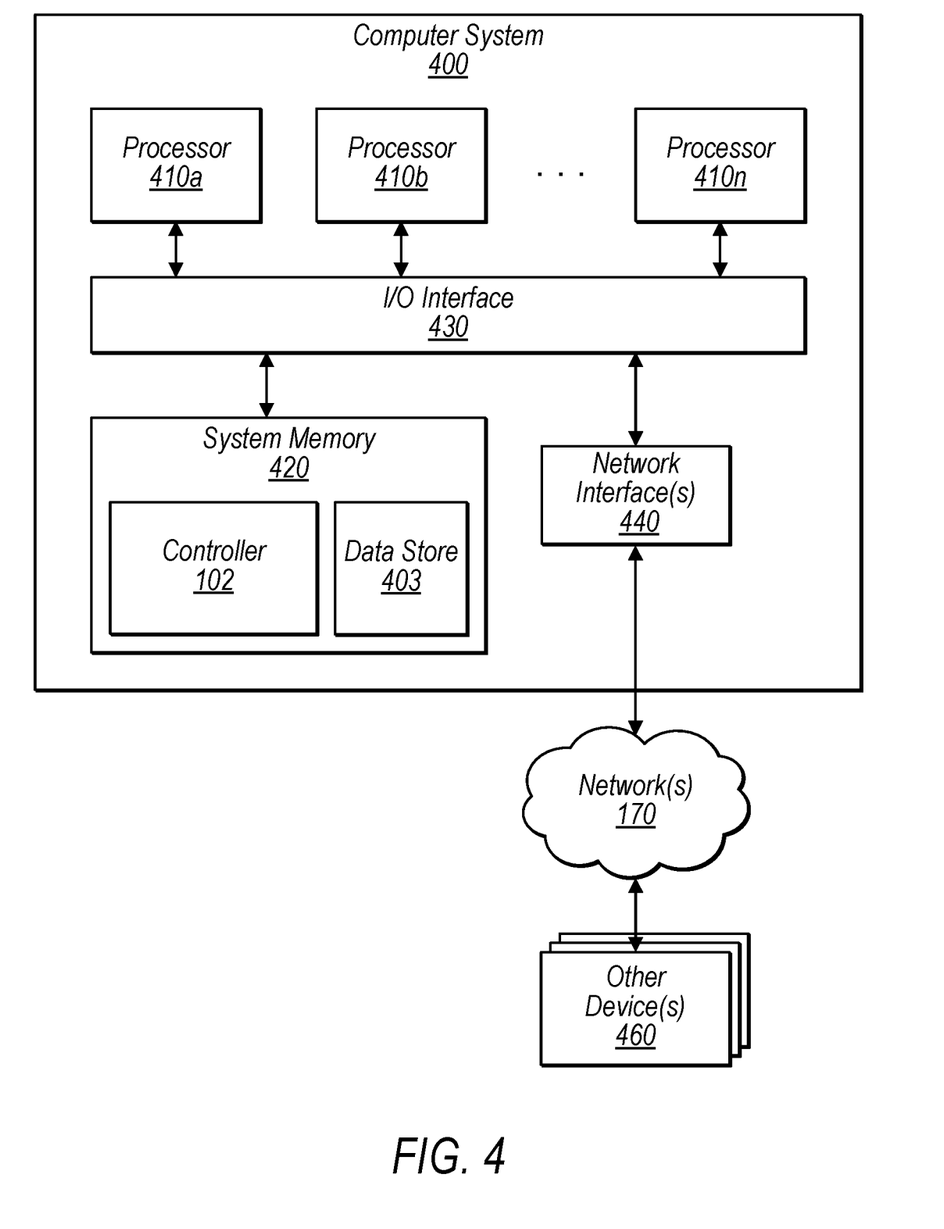
FIG. 4 is a block diagram showing an example computing system to implement the various techniques described herein, according to some embodiments.

FIGS. 1 and 4 illustrate components of a control system architecture, various portions of which may perform the functionality illustrated in the processes illustrated in FIGS. 2 and 3. For example, various components of either of a control center 180 or of a data access and control unit 102 may perform various steps of the illustrated process for continued power for grinder pumps based on elevated load illustrated in FIG. 2 and/or may perform the configuration process illustrated in FIG. 3. Various portions of the illustrated functionality may be performed by one or more of the components, in embodiments. The illustrated steps in the process diagrams may be performed in an alternative order than depicted, in some embodiments.

FIG. 1 is a block diagram illustrating a control system architecture for continued power for grinder pumps based on elevated load, according to some embodiments. FIG. 1 illustrates a Data Access and Control Unit 102a that controls Switched Power 132a (from a Power source 130) to a Grinder/Pump Unit 108a via a Power Switch 104a. In the illustrated embodiment, the Power Switch 104a has a Load Sensor 106a for measuring load on the Grinder/Pump Unit 108a. In some embodiments, the Load Sensor 106a may be external to the Power Switch 104a (e.g., Load Sensor 106a may be connected to the Grinder/Pump Unit 108a leads, or otherwise). Also illustrated is a Thermal Sensor 110a for sensing a temperature associated with the Unit 108a and Water Level Sensor 112 (e.g., a float or transducer or the like) for sensing a level of water to be pumped by the unit 108a. These components, (including Data Access and Control Unit 102a and Unit 108a etc. are illustrated as located at Remote Site 190a, physically remote from Control Center 180. In embodiments, the Data Access and Control Unit 102a performs the processes illustrated in FIGS. 2 and 3, based on signals or data received from sensors 110a, 112a. In some embodiments, Data Access and Control Unit 102a may transmit signals to, and receive signals from Control Center 180, which may perform various of the functionality described herein.

In some embodiments, the Unit 108a or the Data Access and Control Unit 102a may be equipped with or to receive a signal from various sensors, such as but not limited to a power overload sensor, which may be the same as, or may be distinct from, the load sensor 106a.

FIG. 1 illustrates additional Remote sites 190n that are physically remote from Control Center 180. Remote Sites 190n are illustrated with respective Other Data Access and Control Units 102n and Other Industrial Unit(s) 108n (e.g., other grinders, choppers, pumps, or other equipment, etc.). Control Center 180 is illustrated with a network connection to Network 170 that provides communication between the Remote Sites 190a-n and the Control Center 180.

FIG. 2 is a process diagram illustrating workflows for a control system architecture for continued power for grinder pumps based on elevated load, according to some embodiments. The illustrated process may be performed by Control Center 180, Data Access and Control Unit(s) 102a-n, or some combination thereof, in various embodiments. At block 202, the controller waits to receive a high water start signal (e.g., from a water height sensor such as a float, transducer, or the like) or some other start signal (e.g., a start signal from Central Control 180, triggered by an operator, etc.). If no signal is received, (block 202, no) the controller continues to wait. If a high water start or other start signal (e.g., from Central Control) is received (block 202, yes) the controller signals for power to be sent to the unit (block 204) instructing a power switch 104a to switch power on to unit 108a, for example. Power continues to be sent to the unit. The controller waits to receive a shutoff signal (block 206). If no signal is received (block 206, no) the system continues to send power to the unit (block 204) and so on. If a shutoff signal is received (block 206, yes) a determination is made whether the shutoff signal was a low water level power off signal or another signal (block 208). If the signal was some other signal (e.g., a high load or thermal shutoff signal, or other) a signal is sent to discontinue power to the unit (block 208, Other).

For a low water level power off signal (block 208, water level shutoff) a determination of whether a measure load is above an override threshold Y (block 210). If a measure of the load is not above an override threshold Y (block 210, no) power to the unit is switched off (block 218). Otherwise (block 210, yes) the power off signal is overridden and power is continued to the unit (block 212). If measured load is above a high load shutoff threshold Z (block 214, yes) or some other shutoff signal is received (e.g., a high load or thermal shutoff signal, or other) power to the unit is discontinued (block 218). If measured load is below a high load shutoff threshold Z (block 214, no) a determination of whether the measured load has dropped backed to a normal load range X (or below a load drop threshold W, in embodiments) may be used to determine whether to continue the override (block 216, no) or discontinue the override (block 216, yes), resulting in sending a signal to discontinue power to the unit (block 218). The controller may then go back to waiting to receive a high water start or other start signal (block 202) and so on, in embodiments.

In some embodiments, the override may be performed for some period of limited time before being discontinued. The period of time may be configurable, in embodiments.

In embodiments, the load drop threshold W may be set at, near, or just above the normal load level. In some embodiments, the load drop threshold W may be set somewhere in between the normal load level X and the override threshold Y.

FIG. 3 is a process diagram illustrating a configuration process for a controller that continues power for grinder pumps based on elevated load, according to some embodiments. In embodiments, the illustrated configuration process may be performed by one or more components of one or more controllers such as by control software and/or hardware at Control Center 180, and/or at Data Access and Control Unit 102a, for example.

At block 302, measurements of load are obtained. For example, load sensor 106a may measure load of the Grinder/Pump Unit 108a or at a switched power source 104A and provide a measurement of the load (e.g., as a value, a metric, a percentage or otherwise, etc.) to Data Access and Control Unit 102a. In some embodiments, the Control Unit 102a may provide the measurement to Control Center 180, over network 170, for example. A determination of whether sufficient data to determine various parameters has been obtained (block 304) by the control unit 102a, or by the control center 180, for example. If the data is insufficient (block 304, no), additional measurements are obtained (block 302). Otherwise (block 304, yes) a controller may calculate (block 306) a normal load X (a value, a percentage or a range of values for normal operation, or the like), an override threshold Y, a load drop threshold Z, and/or a load drop threshold W for the unit for which the load measurements were obtained. The values may be stored (block 308). For example, the values may be stored in memory at Data Access and Control Unit 102a or at Control Center 180.

In some embodiments, an amount of time for performing the override may be calculated by the controller and stored, based on the load measurements, for example.

Various embodiments of control units 102 and a control center 180 are described and illustrated herein. The illustrated functionality may be performed by any of various combinations of hardware and software. In a non-limiting example, a system based on a supervisory control and data acquisition (SCADA) control system architecture comprising computers, networked data communications and graphical user interfaces (GUI) for high-level process supervisory management may manage and control units as described herein. In embodiments, control units 102 may be implemented as peripheral devices like programmable logic controllers (PLC) and discrete proportional-integral-derivative (PID) controllers to interface with units 108. It is contemplated that the functionality disclosed herein may be implemented in hardware alone, or a combination of hardware and software.

In embodiments, PLCs are connected to sensors and actuators, and are networked to the supervisory system. In automated systems, PLCs may have a high-speed connection to the SCADA system. In remote applications, such as a large water treatment plant, PLCs may connect directly to SCADA over a wireless link, or utilize an RTU for the communications management. PLCs may be used for remote sites where there is a large I/O count, rather than utilizing an RTU alone.

Various architectures, including at least some described herein may incorporate remote terminal units, also known as (RTUs), that connect to sensors and actuators, and are networked to the supervisory computer system (e.g., Control Center 180). RTUs have embedded control capabilities and often conform to the IEC 61131-3 standard for programming and support automation via ladder logic, a function block diagram or a variety of other languages. RTUs may run off solar power system, using radio, GSM or satellite for communications, and may be ruggedized to survive various temperature and moisture conditions without external heating or cooling equipment, in embodiments.

In embodiments, network 170 connects the supervisory computer system 180 to the RTUs and PLCs, and may use industry standard or manufacturer proprietary protocols. In embodiments, both RTU's and PLC's may operate autonomously on the near-real time control of the process, using the last command given from the supervisory system. Failure of the communications network does not necessarily stop the plant process controls, and on resumption of communications, the operator can continue with monitoring and control.

Some critical systems will have dual redundant data highways, often cabled via diverse routes, in embodiments.

In some embodiments, a controller controls power to a grinder pump, wherein control comprises: sending, subsequent to receipt of a high water start signal, a signal to send power to the grinder pump. The control may include determining, subsequent to receipt of a low water power off signal indicating power should be discontinued: determining that a load on the pump is above an override threshold. The control may include overriding, based on the determination that the load is above the override threshold, the low water power off signal, wherein overriding causes the power to continue to the grinder pump despite receipt of the low water power off signal.

In some embodiments, the method further includes obtaining measurements of load on the grinder pump as the grinder pump pumps wastewater and grinds debris, and calculating, based on the measurements of load, the override threshold. In some embodiments, the method also includes determining that the load on the pump has dropped below a load drop threshold and discontinuing the override of the low water power off signal, wherein discontinuing the override causes the power to be discontinued to the grinder pump.

In some embodiments, the method includes recording measurements of load on the grinder pump as the grinder pump pumps wastewater and grinds debris, and calculating, based on the measurements of load, the load drop threshold.

FIG. 4 is a block diagram showing an example computing system to implement the various techniques described herein, according to some embodiments. For example, in one embodiment, the above-described control system architecture for continued power for grinder pumps based on elevated load may be implemented by one or more of a computer system, for instance, a computer system as in FIG. 4 that includes one or more processors executing program instructions stored on a computer-readable storage medium coupled to the processors. In the illustrated embodiment, computer system 400 includes one or more processors 410a-n coupled to a system memory 420 via an input/output (I/O) interface 430. Computer system 400 further includes a network interface 440 coupled to I/O interface 430. While FIG. 4 shows computer system 400 as a single computing device, in various embodiments a computer system 400 may include one computing device or any number of computing devices configured to work together as a single computer system 400.

In various embodiments, computer system 400 may be a uniprocessor system including one processor 410, or a multiprocessor system including several processors 410 (e.g., two, four, eight, or another suitable number). Processors 410 may be any suitable processors capable of executing instructions. For example, in various embodiments, processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

System memory 420 may be one embodiment of a computer-accessible medium configured to store instructions and data accessible by processor(s) 410. In various embodiments, system memory 420 may be implemented using any non-transitory storage media or memory media, such as magnetic or optical media, e.g., disk or DVD/CD coupled to computer system 400 via I/O interface 430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 400 as system memory 420 or another type of memory. Further, a computer-accessible medium may include transmission media or signals such as electrical, electromagnetic, or digital signals, conveyed via a communication medium such as a network and/or a wireless link, such as may be implemented via network interface 440. In the illustrated embodiment, program instructions (e.g., code) and data implementing one or more desired functions, e.g., functionality with regard to the various illustrated workflows etc. described above in FIGS. 2-3, are shown stored within system memory 420 as Controller code 102 and data store 403.

In one embodiment, I/O interface 430 may be configured to coordinate I/O traffic between processor 410, system memory 420, and any peripheral devices in the device, including network interface 440 or other peripheral interfaces. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices 460 attached to a network or networks 170. In various embodiments, network interface 440 may support communication via any suitable wired or wireless general data networks, such as types of Ethernet network, for example. Additionally, network interface 440 may support communication via telecommunications/telephony networks such as analog voice networks or digital fiber communications networks, via storage area networks such as Fiber Channel SANs, or via any other suitable type of network and/or protocol.

In some embodiments, system memory 420 may be one embodiment of a computer-accessible medium configured to store program instructions and data as described above for FIGS. 1-4. Generally speaking, a computer-accessible medium may include non-transitory storage media or memory media such as magnetic or optical media, e.g., disk or DVD/CD coupled to computer system 400 via I/O interface 430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 400 as system memory 420 or another type of memory. Further, a computer-accessible medium may include transmission media or signals such as electrical, electromagnetic, or digital signals, conveyed via a communication medium such as a network and/or a wireless link, such as may be implemented via network interface 440.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Figure 5:
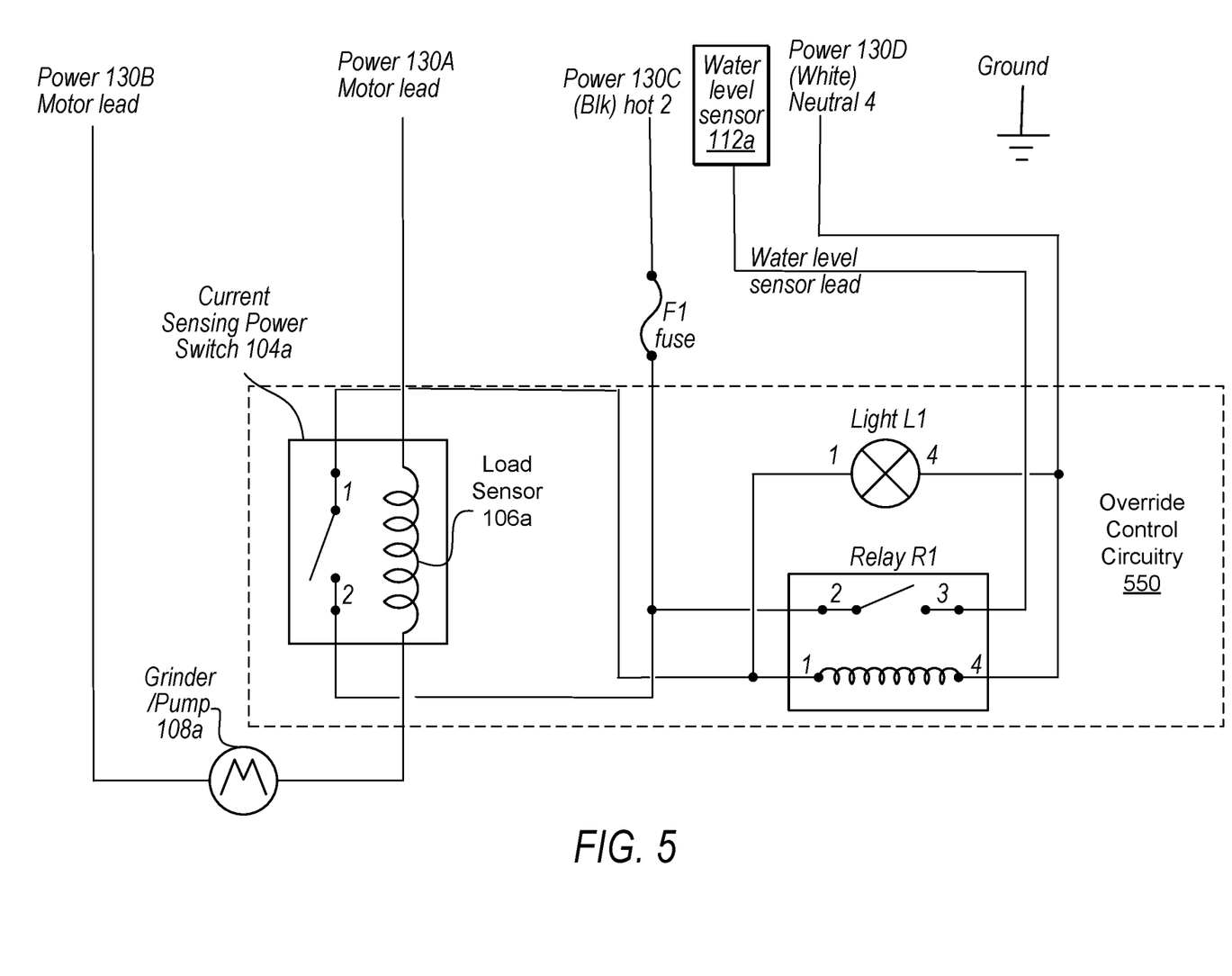
FIG. 5 is a schematic diagram illustrating circuitry for continued power for grinder pumps, according to some embodiments.

FIG. 5 is a schematic diagram illustrating circuitry for continued power for grinder pumps, according to some embodiments. Generally, FIG. 5 illustrates a Grinder/Pump 108a, with Override Control Circuitry 550 that includes a Current-Sensing Power Switch 104a (e.g., an adjustable set point AC current switch, or the like), a relay R1 and a light L1 with various circuitry connecting the components. In embodiments, the components and circuitry function to bypass or override a "power-off" signal from a water level sensor or float (e.g., in some embodiments, the components and circuitry continue to provide power to the signal side of a water level sensor, thereby mimicking a signal that indicates that the Grinder/Pump 108a should continue pumping and grinding.

In embodiments, the Grinder pump 108a, Power switch 104a, Relay R1 and light L1 may be packaged as a single unit. In some embodiments, the Power switch 104a, a relay R1 and a light L1 may be packaged as a unit (e.g., as an Override Control Circuit) separate from or separable from Grinder/Pump 108a. It is contemplated that the illustrated components may be packaged or arranged in different combinations and with or without other components (e.g., as an Override Control Circuit) in embodiments.

FIG. 5 illustrates Grinder/Pump 108a (e.g., including a motor for powering the grinder) with Power motor leads 130A/130B. Non-exhaustive examples of pumps include pumps for wastewater, stormwater, industrial water, clean water and booster pump stations, residential or commercial sewage grinder pumps (submersible or otherwise), duplex sewage grinder (or ejector) pump stations, etc., without limitation. Grinder pump 108a is illustrated with motor leads, one of which is coupled to Current-Sensing Power Switch 104a (e.g., an alternating current (A/C) current-sensing power switch).

Current-Sensing Power switch 104a measures power draw by, or load on, Grinder/Pump 108 as the Grinder/Pump 108a works to pump and grind. Generally, when the load is low, the switch part of the Current-Sensing Power Switch 104a remains open and the switch 104a closes when the load is higher. In embodiments, the points at which the switch opens and/or closes may be configurable (e.g., in accordance with a normal range (x) (e.g., FIG. 2, block 216) and/or in accordance with a high load (Z) (e.g., FIG. 2, block 214). When Switch 104a closes (e.g., due to higher measured load) power from Power 130C source (Blk) (hot) (e.g., 120 volt) flows through an in-line fuse F1, through Switch 104a to Relay R1. FIG. 5 illustrates that the power or signal from Switch 104a causes the switch in Relay R1 to close, thereby delivering the power from Power 130C (Blk) hot to travel to Water level sensor 112a (thereby overriding the Water level sensor 112a). Such a feature may cause power to continue to be delivered to the Grinder/Pump 108a, even when the Grinder/Pump would have been shutoff due to a water level sensor indicating that the water level has dropped too low to continue pumping (e.g., in order to continue grinding). In embodiments, when the Load Sensor 106a indicates that the load on the Grinder/Pump 108a has dropped to a normal level (or is no longer elevated) the switch at the Current-Sensing Power Switch 104a may open, stopping the flow of electricity to Relay R1, and stopping the override of the Water level sensor 112a, and power to the Grinder/Pump 108a is discontinued (placing the system in a "normal" operating configuration, where power to the Grinder/pump 108a is controlled by the water level sensor, for example).

In some embodiments, Power 130C may come from a constant power source, such as from a constant power lead of a water level sensor (e.g., a constant power lead of a float). Current-Sensing Power Switch 104a is illustrated with Load Sensor 106A for measuring load (e.g., such as, but not limited to, in amps) on the Grinder/Pump 108a. It is contemplated that the Load Sensors 106a may be located elsewhere, such as, but not limited to, outside of the Power switch 104a, along the Power 130A Motor lead or Power 130B Motor Lead, for example.

In some embodiments, Light L1 is lit (powered) when the switch at Power Switch 104a is closed, effectively completing the circuit that powers the Grinder/Pump 108a. The light L1 thus provides an indication that electrical power is being provided to the Grinder/Pump 108a.

Figure 6:
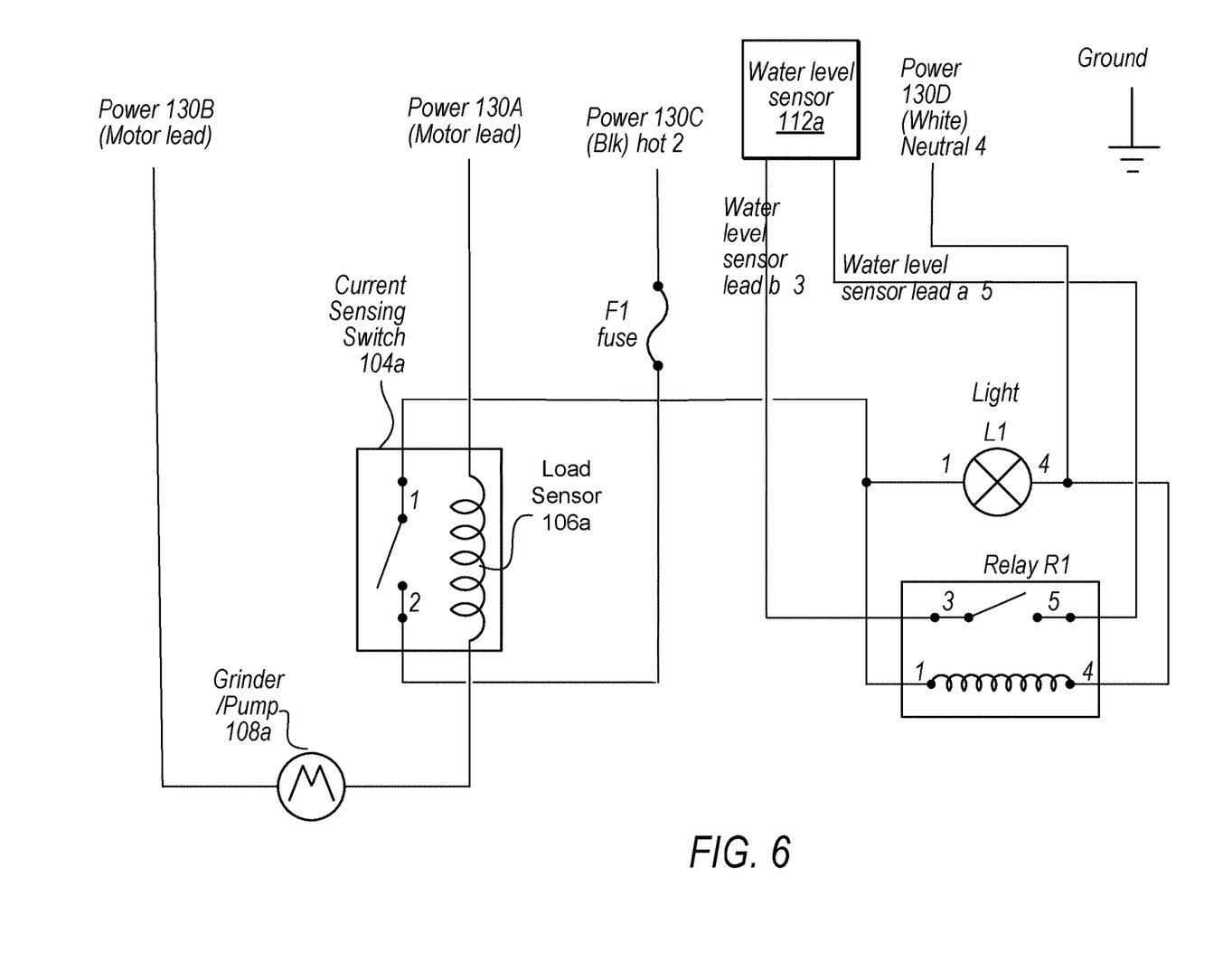
FIG. 6 is a schematic diagram illustrating circuitry for continued power for grinder pumps, according to some embodiments.

FIG. 6 is a schematic diagram illustrating circuitry for continued power for grinder pumps, according to some embodiments. FIG. 6 also illustrates Current-Sensing Power Switch 104a connected to Grinder/Pump 108a and Relay R1. FIG. 6 illustrates an embodiment with two leads a/b for Water Level Sensor 112a. In the illustrated embodiment, when the switch of Current-Sensing Switch 104a closes, power is provided to Relay R1, causing the switch of Relay R1 to close and complete the connection between Water level sensor lead a and Water level sensor lead b, thereby overriding or bypassing the Water level sensor 112a, so as to cause power to continue to power the Grinder/Pump 108a even though the water level has dropped below the water-level shutoff threshold, until the load on the Grinder/Pump 108a drops to a more normal level, for example. In embodiments, when the Load Sensor 106a indicates that the load on the Grinder/Pump 108a has dropped to a normal level (or is no longer elevated) the switch at the Current-Sensing Power Switch 104a may open, stopping the flow of electricity to Relay R1, and stopping the override of the Water level sensor 112a, and power to the Grinder/Pump 108a is discontinued (placing the system in a "normal" operating configuration, where power to the Grinder/pump 108a is controlled by the normal operation of the water level sensor, for example).

Figure 7:
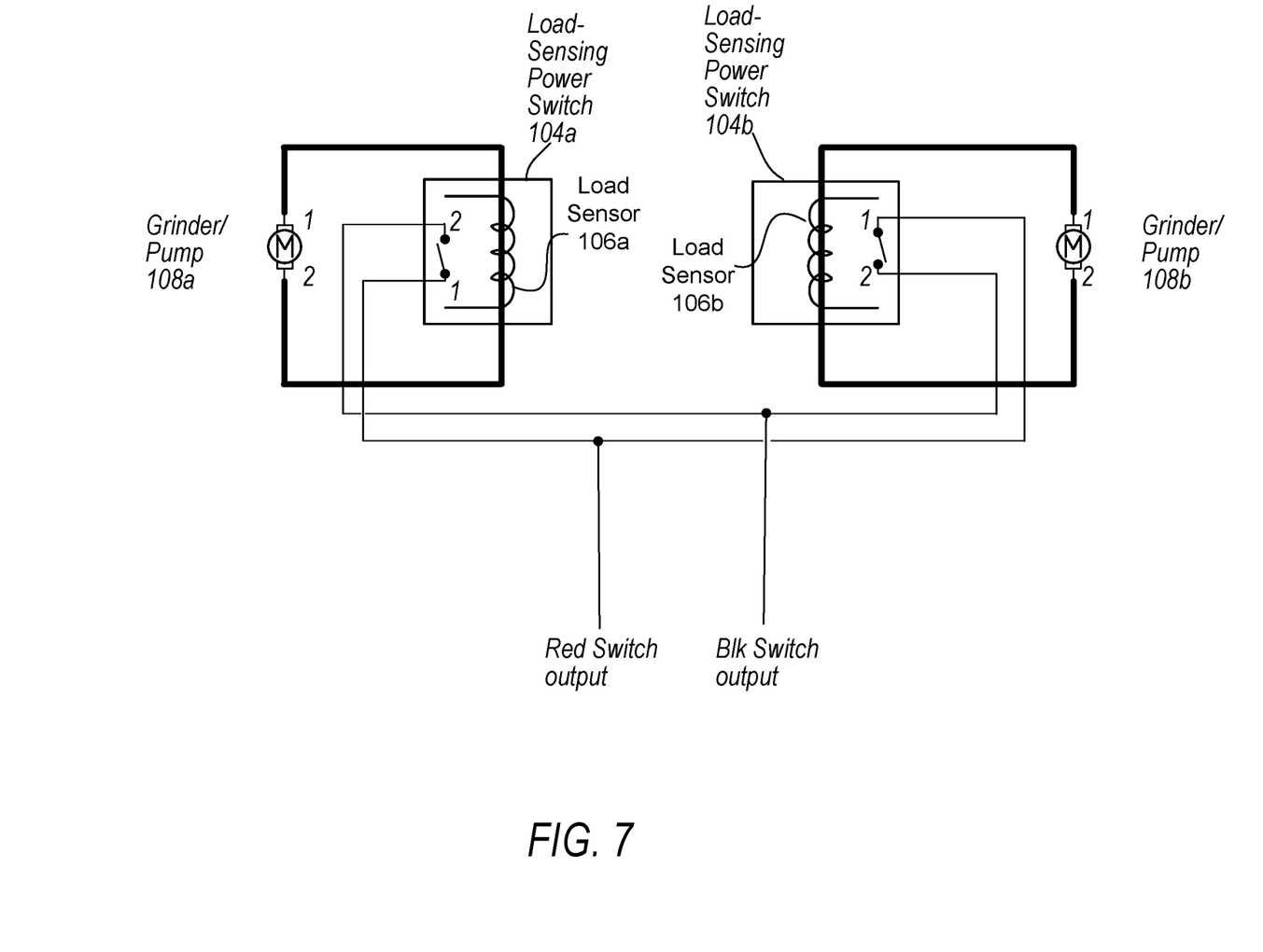
FIG. 7 is a schematic diagram illustrating circuitry for continued power for grinder pumps, according to some embodiments.

FIG. 7 is a schematic diagram illustrating circuitry for continued power for grinder pumps, according to some embodiments. In the illustrated embodiment, a water-level sensor override circuit monitors whether load on either or both of Pump/Grinder 108a and/or Pump/Grinder 108b is higher than a normal load. If the load is higher than normal (e.g., above some configurable threshold or the like) a Load-Sensing Power Switch 104a/b will close a circuit, causing a water-level sensor switch to be bypassed (e.g., as if the water-level sensor switch is indicating water level is high). Some such configurations allow the Pump/Grinder 108b to continue to run until a normal load is measured, at which point Load-Sensing Power Switch 104a/b will open, allowing the system to operate normally, in accordance with the water level sensor.

Figure 8:
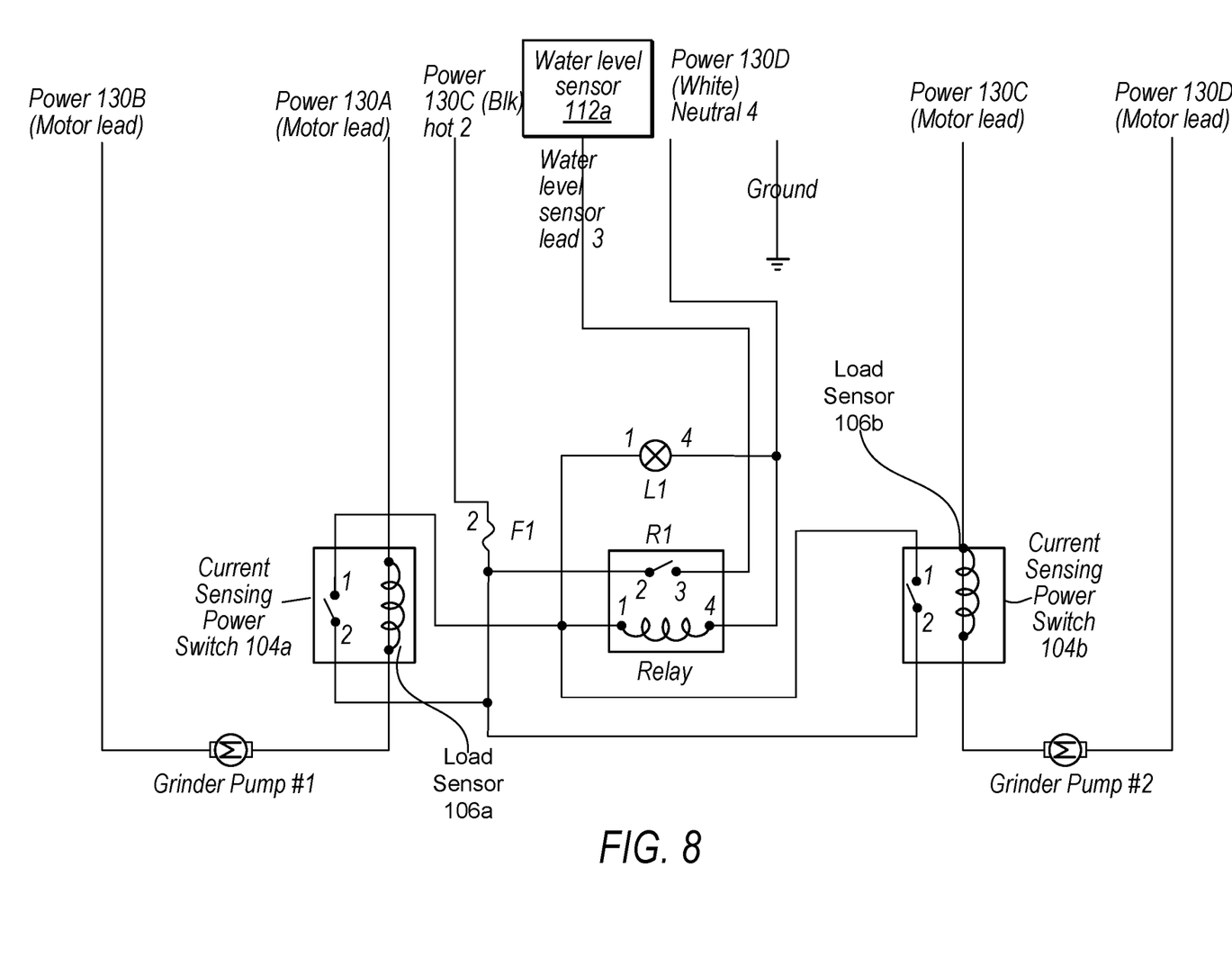

FIG. 8 is a schematic diagram illustrating circuitry for continued power for two or more grinder pumps, according to some embodiments. In the illustrated embodiment, water-level sensor override circuit monitors whether load on either or both of Pump/Grinder 108a and/or Pump/Grinder 108b is higher than a normal load. FIG. 8 illustrates Pump/Grinder 108a and 108b, each with respective Load-Sensing Power Switches (104a/b). In the illustrated embodiment, the Pump/

Grinders 108a/b share a common water level sensor and both Grinder/Pumps 108a/b are either powered on due to an override condition ore are both powered off, together. It is contemplated that systems with more than one Pump/Grinder may be configured with more than one water level sensor, controlling operation of respective Pump/Grinders, in some embodiments. It is contemplated with the system illustrated in FIG. 8 may be adapted to operate in accordance with the two-lead water level sensor embodiment in FIG. 6, in some embodiments.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
   one or more components configured to:
      control power to a grinder pump, wherein control comprises:
         subsequent to receipt of a high water start signal, send a signal to send power to the grinder pump;
         subsequent to receipt of a low water power off signal indicating power should be discontinued:
            determine that a load on the pump is above an override threshold; and
            override, based on the determination, the low water power off signal, wherein override causes the power to continue to the grinder pump despite receipt of the low water power off signal.

2. The system of claim 1,
   wherein the one or more components are configured to:
      obtain measurements of load on the grinder pump as the grinder pump pumps wastewater and grinds debris; and
      calculate, based on the measurements of load, the override threshold.

3. The system of claim 1, wherein to control power to the grinder pump, the one or more components are configured to:
   determine that the load on the pump has dropped below a load drop threshold; and
   discontinue the override of the low water power off signal, wherein discontinue the override causes the power to be discontinued to the grinder pump.

4. The system of claim 3,
   wherein the one or more components are configured to:
      record measurements of load on the grinder pump as the grinder pump pumps wastewater and grinds debris; and
      calculate, based on the measurements of load, the load drop threshold.

5. The system of claim 1, further comprising:
   the grinder pump, configured to be controlled by a control system configured to perform said send the signal, said determine that the load is above an override threshold, and said override the low water power off signal.

6. The system of claim 1, wherein one or more of the high water start signal and the low water power off signal are generated by a float or transducer.

7. The system of claim 1, wherein said one or more components are compliant with a supervisory control and data acquisition (SCADA) architecture.

8. The system of claim 1, further comprising:
   a load sensor to perform said determine that the load on the pump is above an override threshold; and
   a relay to perform said override, based on the determination, the low water power off signal.

9. A method, comprising:
   controlling power to a grinder pump, wherein controlling comprises:
      subsequent to receipt of a low water power off signal indicating power should be discontinued:
         determining, by a load sensor, that a load on the pump is above an override threshold; and
         overriding, by at least a relay and based on the determination that the load is above the override threshold, the low water power off signal, wherein overriding causes the power to continue to the grinder pump despite receipt of the low water power off signal.

10. The method of claim 9, further comprising:
    obtaining measurements of load on the grinder pump as the grinder pump pumps wastewater and grinds debris; and
    calculating, based on the measurements of load, the override threshold.

11. The method of claim 9, further comprising:
    determining that the load on the pump has dropped below a load drop threshold; and
    discontinuing the override of the low water power off signal, wherein discontinuing the override causes the power to be discontinued to the grinder pump.

12. The method of claim 9, further comprising:
    recording measurements of load on the grinder pump as the grinder pump pumps wastewater and grinds debris; and
    calculating, based on the measurements of load, the load drop threshold.

13. A control system, comprising:
    override control circuitry configured to perform:
       controlling power to a grinder pump, wherein controlling comprises:
          subsequent to receipt of a low fluid power off signal indicating power should be discontinued due to low fluid level:
             determining that a load on the grinder pump is above an override threshold; and
             overriding, based on said determining that the load is above the override threshold, the low fluid power off signal, wherein overriding causes the power to continue to the grinder pump despite receipt of the low fluid power off signal.

14. The control system of claim 13, further comprising one or more hardware components configured to perform:
    obtaining measurements of load on the grinder pump as the grinder pump pumps wastewater and grinds debris; and
    calculating, based on the measurements of load, the override threshold.

15. The control system of claim 13, further comprising one or more hardware components configured to perform:

recording measurements of load on the grinder pump as the grinder pump pumps wastewater and grinds debris; and calculating, based on the measurements of load, the load drop threshold.

16. The control system of claim 13, wherein the override control circuitry is configured to perform:

determining that the load on the grinder pump has dropped below a load drop threshold; and discontinuing the override of the low fluid power off signal, wherein discontinuing the override causes the power to be discontinued to the grinder pump.

17. The control system of claim 13, wherein the override control circuitry is compliant with a supervisory control and data acquisition (SCADA) architecture.

18. The control system of claim 13, wherein one or more of a high fluid start signal and the low fluid power off signal are received from a float or transducer.

19. The control system of claim 13, wherein the override control circuitry is configured to perform:

determining that the load on the grinder pump has dropped below a load drop threshold; and discontinuing the override of the low fluid power off signal, wherein discontinuing the override causes the power to be discontinued to the grinder pump.

20. The control system of claim 13, wherein the override control circuitry comprises:

a load sensor to perform said determining that the load on the grinder pump is above an override threshold; and a relay to perform said overriding, based on the determination, the low fluid power off signal.

* * * * *